(12) United States Patent
De Buyst

(10) Patent No.: US 6,329,600 B1
(45) Date of Patent: Dec. 11, 2001

(54) SCREEN CONNECTION FOR MECHANICO RETRACTABLE PRODUCTS

(75) Inventor: Jo De Buyst, Aalst (BE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/452,129

(22) Filed: Dec. 1, 1999

(30) Foreign Application Priority Data

Dec. 10, 1998 (EP) .................................................. 98403112

(51) Int. Cl.$^7$ .................................................. H02G 15/08
(52) U.S. Cl. ........................................................ 174/88 C
(58) Field of Search .............................. 174/73.1, 75 C, 174/78, 84 R, 88 C, 88 R; 439/585, 638

(56) References Cited

U.S. PATENT DOCUMENTS

| | | | |
|---|---|---|---|
| 3,830,957 | | 8/1974 | Oberdiear et al. ...................... 174/78 |
| 3,872,237 | * | 3/1975 | Eyre et al. .......................... 174/88 C |
| 5,028,742 | * | 7/1991 | Redman ............................. 174/88 R |
| 5,217,392 | * | 6/1993 | Hosler, Sr. ........................... 439/585 |
| 5,554,825 | * | 9/1996 | Parker et al. ...................... 174/117 F |
| 5,821,459 | * | 10/1998 | Cheenne-Astorino et al. .... 174/73.1 |

FOREIGN PATENT DOCUMENTS

| | | |
|---|---|---|
| 0 435 569 A1 | 7/1991 | (EP) . |
| 0 594 935 A2 | 9/1992 | (EP) . |
| 2 655 488 A1 | 6/1991 | (FR) . |
| WO 96/13080 | 5/1996 | (WO) . |

* cited by examiner

*Primary Examiner*—Chau N. Nguyen
(74) *Attorney, Agent, or Firm*—Sughrue Mion, PLLC

(57) ABSTRACT

A joint adapted to ensure the interconnection of two electrical cables, each cable including a central conductor, an insulation layer (1), a semi-conductive coating layer (2), a metallic cable screen (3) and an outer cable jacket (4). The joint includes mechanically shrink-fittable materials adapted to ensure, when shrunken, a dielectric continuation (5) of the insulation layer, a continuation of the cable screen by a metallic joint screen (6), and an outer protection (7). The invention more particularly concentrates on an improvement of the screen continuation of the cable. The joint includes therefore, a layer of conductive material (9) placed underneath the metallic cable screen (3) at the location where this cable screen is in contact with the joint screen (6). As a result, the joint shows a relatively low electrical resistance between the cable screen and the joint screen, is cost effective and is easy to install. It can furthermore withstand, after installation, the impact of sharp heavy items without damaging either the joint or the cable because there are no cutting items under the outer cable jacket (4).

7 Claims, 1 Drawing Sheet

SCREEN CONNECTION FOR MECHANICO RETRACTABLE PRODUCTS

BACKGROUND OF THE INVENTION

The present invention relates to a joint for interconnecting two electrical cables, each cable comprising a central conductor, an insulation layer, a semi-conductive coating layer, a metallic cable screen and an outer cable jacket, all bared over predetermined lengths, the joint being adapted to ensure the interconnection of the conductors and including mechanically shrink-fittable materials adapted to ensure, when shrunken, a dielectric continuation of the insulation layer, a continuation of the cable screen by means of a metallic joint screen, and an outer protection.

Such a cable joint is generally known in the art, and the present invention will particularly concentrate on the screen continuation of the cables.

The screen continuity should go from the end of a cable over the joint to the end of the other cable. In the joint, a part of the metallic grounding screen of the cable is cut away over a length of more than 30 cm to 60 cm. This part has to be reconstructed. The joint itself is therefore equipped by a screen of wires with a sufficient section, with more than the original section of the cable screen. The goal is to obtain a good connection of the cable screen with the joint screen. A cold shrinkable joint, also called "mechanically shrink-fittable" joint, is pre-assembled in the factory and, for easy and quick installation, the outer protection thereof should cover the complete cable connection, i.e. should also include the screen connection. So, during—and after—installation of the joint, the access to the screen connection is difficult because it will be covered by the outer protection of this joint.

The technical problem is to find a quick installable and adequate screen connection developed according to existing standards. This requires a screen connection with sufficient contact pressure and contact surface between the cable screen and the joint screen to guarantee a resistance of the whole screen connection that is as low as possible. The reason therefore, is to avoid heat build-up and damage on the outer cable jacket and/or on the semi-conductive coating layer. Furthermore, the screen connection should be as cheap as possible.

Such a screen connection is generally realized by using a so-called "roll-spring", e.g. the "Rollfedern Typ RF" of the German company CELLPACK GmbH—Electrical Products, located at D-79761 Waldshol-Tiengen. A roll-spring is a spiral-winded ribbon of steel that is placed around the bared metallic screen of the cable before the installation of the joint.

The roll-spring is used to increase the contact surface between the cable screen and the joint screen, especially when these screens are made of wires, as is generally the case. However, since the roll-spring is made of steel, it has a relatively high electrical resistance. The steel ribbon also has a limited width whereby the whole length of the bared cable screen is not covered. Due to the differences of thickness of the parts of the cable screen covered and not covered by the roll-spring, it is difficult to ensure a good electrical contact with the joint screen. As a result, the cable may be damaged because of poor electrical contacts that can cause a bad screen connection and/or an electrical failure of the joint. Also the installation of the spring is not easy because the spiral has to be opened in order to be wound around the cable. Moreover, in order to improve the electrical contact between the cable screen and the joint screen, these screens are placed between different layers of the steel spiral. However, the joint screen can only be inserted into the spiral when the joint has been shrunken over the cables. The outer protection of the joint has then to be removed, at least partially. This operation may reduce the sealing effect of the outer protection of the joint and is time consuming. The roll-spring further has very cutting edges which can damage parts of the joint during installation. It can cut the outer protection of the joint, during and after installation. During installation, it can for instance also cut the sliding film of the supporting tube of the joint.

SUMMARY OF THE INVENTION

An object of the present invention is to provide a joint of the above known type but which shows a relatively low electrical resistance between the cable screen and the joint screen, which is relatively cheap and easy to install, and which can withstand, after installation, impact of sharp, heavy items without damaging either the joint or the cable. This means that there should be no cutting items under the outer cable jacket.

According to the invention, this object is achieved due to the fact that a layer of conductive material is placed underneath the metallic cable screen at the location where the cable screen is in contact with the joint screen.

In this way, the layer of conductive material avoids that the screen wires damage the cable or the joint, e.g. by pushing into the outer cable jacket or into the semi-conductive coating layer. Furthermore, the layer is easy and quick to install, especially because there is no spring effect to overcome. It could further be relatively cheap in function of the conductive material used and owing to the speed of the operation. It has been proven that a single layer of conductive material wound around the cable is sufficient to provide a good cylindrical electrical contact between the wires of the cable screen and the joint screen.

Another characteristic feature of the present invention is that the layer of conductive material surrounds the cable over a width corresponding to the bared length of the cable screen.

The largest possible contact surface is so obtained.

In a first and preferred embodiment, the invention is characterized in that the cable screen is folded back over the outer cable jacket and in that the layer of conductive material is placed between the outer cable jacket and the cable screen.

In a second embodiment, the present invention is characterized in that the layer of conductive material is placed between the semi-conductive coating layer and the cable screen.

In this way, in a normal case of a concentric wire screen of the cable, the wires are placed either on the outer cable jacket or on the semi-conductive coating layer. With temperature and pressure on these wires, the risk that these wires are pushed into the cable jacket or semi-conductive layer is dramatically reduced owing to the presence of the protective layer of conductive material.

A further characteristic feature of the present invention is that the conductive material is a copper tape.

Copper is well known for its good electrical conductivity. The tape may further be relatively thin and thereby easy to install. Moreover, it will not increase significantly the overall diameter on the cable. The screen connection is thereby not size-sensitive.

Also another characteristic feature of the present invention is that the conductive material is tin-plated. This provides a better resistance against corrosion.

Also another characteristic feature of the present invention is that the layer of conductive material has a surface provided with adhesive material. It is then very easy to stick it onto the cable jacket or onto the semi-conductive coating layer.

Further characteristic features of the present invention are mentioned in the appended claims.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE PREFERRED EMBODIMENTS

Figure 1:
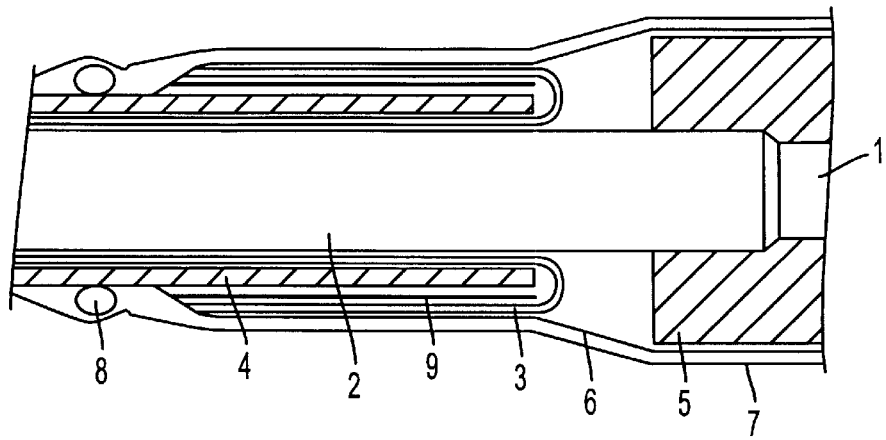
FIG. 1 is a cut-away view of the longitudinal section of the end of an electrical power cable encapsulated in a joint according to a first embodiment of the invention.

An end portion of an electrical power distribution cable covered by a joint is shown at FIG. 1. The power distribution cable is basically constructed of a central conductor for the power transmission, an insulation layer 1, a semi-conductive coating layer 2, a metallic grounding cable screen 3 and an outer protection jacket 4. The connection of two such cables is done by means of a so-called "joint". The latest technology for jointing medium voltage cables consists of using a mechanically shrink-fittable or cold shrinkable joint. Such a joint comprises a conductor connection (not shown), an insulation body 5 that provides a dielectrical continuation of the insulation layer 1 of the cable, a joint screen 6 that ensures the continuation of the screen 3 of the cable, and an outer protection 7.

The electrical connection of bared ends of the central conductor of two cables by means of a conductor connection is well known by a person normally skilled in the art and is therefore, not described hereafter. When this electrical connection is realized, an expanded tubular cold shrinkable part of the joint is positioned over the conductor connection so as to completely cover this connection as well as the insulated ends of the two cables. The inner support tube of the joint is then removed and the joint shrinks against the cables. The shrunken joint not only ensures the dielectrical continuation and the screen continuation between the cables but, owing to the pressure exerted on the cable, also ensures a good external protection of the connection. This external protection may further be increased by a water sealing ring 8 provided at each end of the joint on the outer jacket of the cable.

The present invention more particularly concentrates on the electrical connection between the metallic grounding cable screen 3 and the metallic joint screen 6. The cable screen 3 is bared over a length of about 5 cm which has to come into contact with an end of the joint screen 6.

Figure 2:
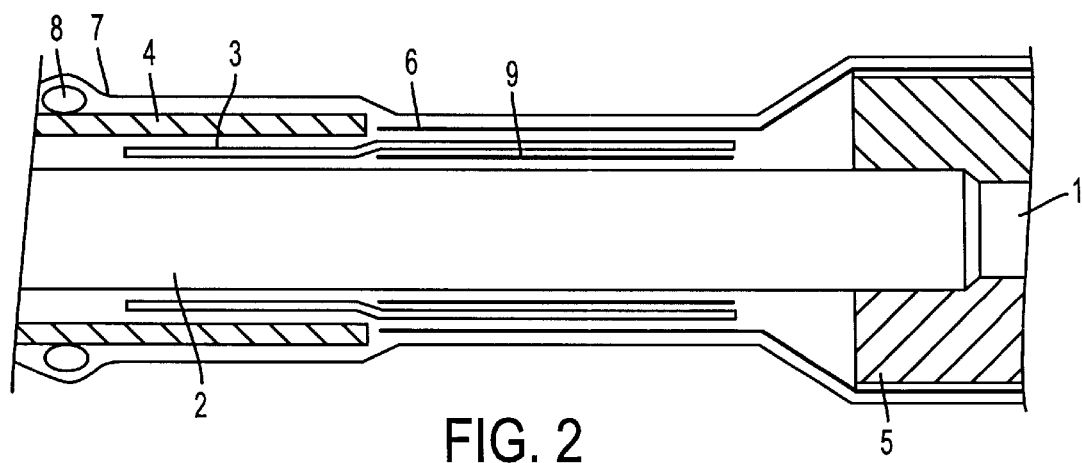
FIG. 2 represents a similar view as in FIG. 1 but with a joint according to a second embodiment of the invention.

In a first and preferred embodiment, shown at FIG. 1, the bared cable screen 3 is folded back over the outer cable jacket 4, whilst in a second embodiment, shown at FIG. 2, the bared cable screen 3 is left on the semi-conductive layer 2.

In both cases, whether the cable screen is folded back on the cable jacket 4 or remains on the semi-conductive layer 2, a thin layer of conductive material 9 is placed underneath the wires of this cable screen 3. The layer 9 is thus provided, before the positioning of the shrinkable joint, at a location where the cable screen 3 will be in contact with the joint screen 6. To have a contact surface that is as large as possible, the layer should have a width that corresponds to the length of the bared cable screen. This layer 9 then ensures a good cylindrical electrical contact of the screens and prevents the wires of the cable screen 3 from damaging the underlying cable jacket 4 or semi-conductive layer 2. As the screen wires, the conductive material is preferably copper which is a cost effective material with good electrical conductivity characteristics. The copper foil will have a thickness that may vary from a few microns to one millimeter. In order to fix it very easily onto the cable jacket 4 or onto the semi-conductive layer 2, the copper foil 9 may be provided as an adhesive layer (not shown). This adhesive layer may be conductive or non-conductive. The metallic layer 9 may also be tin-plated in order to have a better corrosion resistance. In practice, it has been found that only one single layer of copper foil surrounding the cable jacket 4 or the semi-conductive layer 2 needs to be provided. This single layer will not increase the thickness of the cable and is sufficient to satisfy the requirements of existing standards, while providing a very good screen connection. The contact pressure from the joint screen 6 towards the cable screen 3 is provided by the shrunken outer protection of the joint.

While the principles of the invention have been described above in connection with specific apparatus, it is to be clearly understood that this description is made only by way of example and not as a limitation on the scope of the invention, as defined in the appended claims.

What is claimed is:

1. A joint for interconnecting two electrical cables, each cable comprising:

central conductor, an insulation layer, a semi-conductive coating layer, a metallic cable screen, and an outer cable jacket, all bared over predetermined lengths, said joint being adapted to ensure an interconnection of the conductors and including mechanically shrink-fittable materials adapted to ensure, when shrunken, a dielectric continuation of the insulation layer, a continuation of said cable screen by a metallic joint screen, and an outer protection, wherein said cable screen is folded back over said outer cable jacket, and a tape of conductive material is placed between said outer cable jacket and the metallic cable screen at a location where said cable screen is in contact with said joint screen.

2. The joint according to claim 1, wherein said layer of conductive material surrounds said cable over a width corresponding to the bared length of said cable screen.

3. The joint according to claim 1, wherein said layer of conductive material is placed between said semi-conductive coating layer and said cable screen.

4. The joint according to claim 1, wherein said conductive material is a copper tape.

5. The joint according to claim 1, wherein said conductive material is tin plated.

6. The joint according to claim 1, wherein said layer of conductive material has a surface provided with adhesive material.

7. The joint according to claim 6, wherein said adhesive material is conductive.

* * * * *